United States Patent [19]

Mallory

[11] Patent Number: 5,501,458
[45] Date of Patent: Mar. 26, 1996

[54] ELECTRONIC GAME CONTROLLER COVERS

[76] Inventor: Kevin C. Mallory, 3344 Highway 11 South, Riceville, Tenn. 37370

[21] Appl. No.: 374,074

[22] Filed: Jan. 19, 1995

[51] Int. Cl.⁶ ................................ A63B 71/04; A63F 9/22
[52] U.S. Cl. .................. 273/148 B; 273/DIG. 30
[58] Field of Search ................. 273/148 B, DIG. 30, 273/738, 81 R; 428/98, 99, 100, 40

[56] References Cited

U.S. PATENT DOCUMENTS

| | | |
|---|---|---|
| 3,614,100 | 10/1971 | Spitz . |
| 4,373,718 | 2/1983 | Schmidt .................. 428/40 X |
| 4,476,742 | 10/1984 | Midgely . |
| 4,530,504 | 7/1985 | Long, Jr. . |
| 4,567,091 | 1/1986 | Spector . |
| 4,573,682 | 3/1986 | Mayon .................. 273/148 B |
| 4,765,856 | 8/1988 | Doubt .................. 273/73 J X |
| 4,785,495 | 11/1988 | Dellis . |
| 5,046,739 | 9/1991 | Reichow . |
| 5,207,791 | 5/1993 | Scherbarth .................. 273/148 B |
| 5,364,677 | 11/1994 | Sendziak .................. 428/40 |

*Primary Examiner*—Raleigh W. Chiu
*Attorney, Agent, or Firm*—Richard C. Litman

[57] ABSTRACT

An enhancing cover for electronic game controllers comprises a controller-specific shaped cover of an absorbent material and attachments for affixing said cover to such a controller. The cover wraps around the back, and in some embodiments, the sides of the controller. In the most preferred embodiment, the cover's position is retained by releasable fasteners, such as hook-and-loop fasteners, thereby allowing removal of the cover for washing. Alternately, the cover may be fixed in place by adhesive material with peel-off protective backing. The cover may be monolithic or comprised by multiple segments. The cover may be colored to vary the appearance of the game controller. The cover may also include a glow-in-the-dark substance so as to add to the controller's novelty and to make the controller easy-to-locate, even in the dark. The cover may have any of a variety of textures, formed to fit the users' hands, or formed to provide additional friction with the users' hands.

10 Claims, 3 Drawing Sheets

ELECTRONIC GAME CONTROLLER COVERS

BACKGROUND OF THE INVENTION

1. Field of the Invention

The present invention relates to accessories for entertainment devices, and more particularly to covers for use with electronic game controllers that are designed to enhance the functionality of such game controllers by providing various additional desirable features.

2. Description of the Prior Art

In the field of covers for electronic game controllers, there is typically a desire among electronic game manufacturers to create the most enjoyable experience for a user of the game as is possible. A game manufacturer will have failed this objective if the user of an electronic game controller is distracted from the playing the game because of unpleasant feeling or discomfort stemming from the game controller. Such discomfort can result from accumulation of the user's perspiration during the course of play. Such perspiration can cause unpleasant sensations or disgust to the user who is trying to concentrate on playing an electronic game. Additionally, such perspiration can prevent accurate manipulation of the controls on the electronic game controller because of the slipperiness concomitant with perspiration accumulated between the user's fingers and the casing and control portions of the controller.

Several attempts have been made to overcome the problem that the present invention solves, as described above. U.S. Pat. No. 3,614,100, issued to Harvey D. Spitz on Oct. 19, 1971, discloses a cylindrical, perspiration-absorbent sleeve for use with racquet handles. The sleeve is formed in such a way that it is not suitable for use with game controllers because it would cover controlling portions of the game controllers and would likely slip off the game controllers, because such controllers are typically not subject to the circumferentially disposed holding force that racquet handles are typically subject to during use.

U.S. Pat. No. 4,476,742, issued to Noel H. Midgely on Oct. 16, 1984, discloses a tape-type cover circumferentially disposed on a racquet handle. The tape is not shaped for use with game controllers. The patent teaches that the preferred tape is tape that will not absorb moisture, such as perspiration, but will instead let perspiration accumulate in grooves to evaporate, eventually.

U.S. Pat. No. 4,530,504, issued to Charles A. Long, Jr., on Jul. 23, 1985, discloses a stabilizing support for a game controller. The support serves to make a game controller more usable by adding weight to it. The support is not designed to absorb perspiration.

U.S. Pat. No. 4,567,091, issued to Donald Spector, on Jan. 28, 1986, discloses an adhesive sports tape for winding on sports devices to provide cushioning and increased gripping function. It is not designed to absorb perspiration.

U.S. Pat. No. 4,785,495, issued to Edward A. Dellis, on Nov. 22, 1988, discloses a handle grip for rod-shaped handles. The grip has ridges to fit between the user's fingers. The sleeve is formed in such a way that it is not suitable for use with game controllers because it would cover controlling portions of the game controllers and would likely slip off the game controllers, because such controllers are typically not subject to the circumferentially disposed holding force that racquet handles are typically subject to during use.

U.S. Pat. No. 5,046,739, issued to James R. Reichow, on Sep. 10, 1991, discloses a handle device suitable for use with a variety of electronic game controllers. The device is ergonomically designed to cushion the device and make it fit better in the user's hand. The device is not designed to absorb perspiration.

None of the above inventions and patents, taken either singly or in combination, is seen to describe the instant invention as claimed.

SUMMARY OF THE INVENTION

By the present invention, an enhancing cover for electronic game controllers is provided that overcomes the above-noted shortcomings, and offers a controller-specific shaped cover of an absorbent material and means for affixing said cover to such a controller. The cover wraps around a back face, and in some embodiments, side-faces and a top-face, of the controller. In a most preferred embodiment, the cover's position is retained by releasable fasteners, such as hook-and-loop fasteners, thereby allowing removal of the cover for washing. Alternately, the cover may be fixed in place by adhesive material with peel-off protective backing. The cover may be monolithic or comprised by multiple segments. The cover may be colored to vary the appearance of the game controller. The cover may also be comprised by or coated with a glow-in-the-dark substance so as to add to the controller's novelty and to make the controller easy-to-locate, even in the dark. The cover may have any of a variety of textures, formed to fit the users' hands, or formed to provide additional friction with the users' hands, such as dimpled (recessed or protruding), grooved, or cross-hatched. The present invention provides manufacturers and users with a convenient device to help assure the comfortable use of an electronic game controller.

Accordingly, it is a principal object of the invention to provide a cover for an electronic game controller.

It is another object of the invention to reduce the accumulation of perspiration on game controllers and thereby increase the users' enjoyment and ability to concentrate on the game.

It is a further object of the invention to provide a game controller gripping surface that has texture tending to increase the friction between the controller and the user's hands.

Still another object of the invention is to protect a game controller from damage by attachment of a cushioned cover.

An added object of the invention is to provide covers for game controllers, that can easily and permanently be applied by means of a layer of adhesive on the game controller cover, that is protected by a peel-away backing before use.

An additional object of the invention is to improve the comfort of a user holding a game controller by providing a cushioned cover between the controller and a user's hands.

Yet a further object of the invention is to provide covers for game controllers that may be easily attached, detached, or reattached, such as by hook-and-loop fasteners.

One more object of the invention is to enable a user to vary the appearance of a game controller at will, merely by attaching, detaching, or reattaching game controller covers with a variety of appearances to a game controller.

A still further object of the invention is to make a game controller easy to locate in darkness by providing a glow-in-the-dark surface, simply by attaching a game-controller cover with such a surface to an ordinary game controller.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides an enhancing cover for electronic game controllers. The cover comprises a controller-specific shaped configuration of an absorbent material and means for affixing this material to such a controller. The cover wraps around a back face of a controller, and in some embodiments, sides or a top face, of the controller. In the most preferred embodiment, the cover's position is retained by releasable fasteners, such as hook-and-loop fasteners, thereby allowing removal of the cover for washing. Alternately, the cover may be fixed in place by adhesive material with peel-off protective backing. The cover may be monolithic, or comprised by multiple segments. The cover may be colored to vary the appearance of the game controller. The cover may also be comprised by a glow-in-the-dark substance so as to add to the controller's novelty and to make the controller easy-to-locate, even in the dark. The cover may have any of a variety of textures, formed to fit the users' hands, or formed to provide additional friction with the users' hands.

Figure 1:
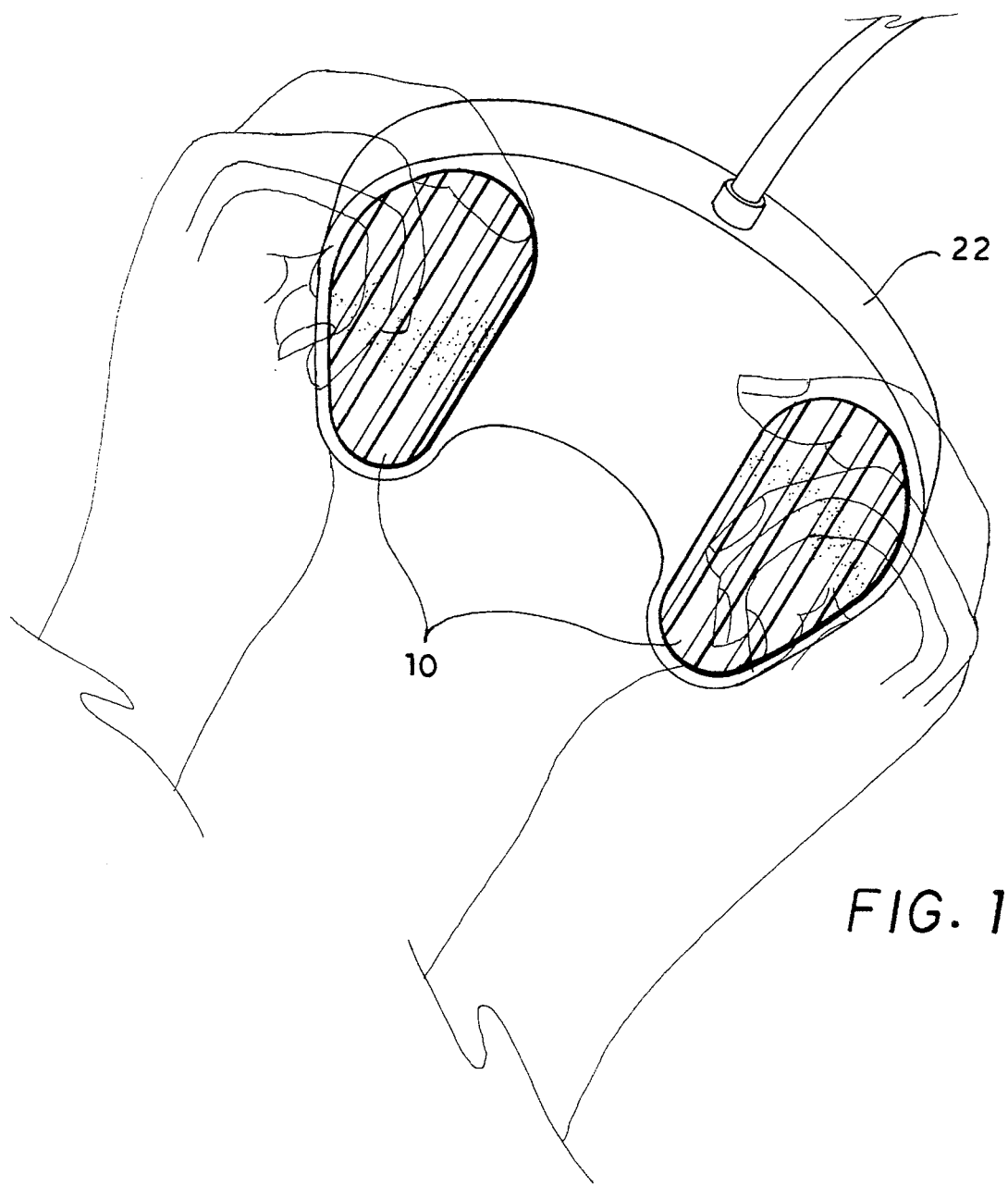
FIG. 1 is an environmental, perspective view of the invention, attached to a game controller.

Referring to the drawings, the cover 10 in FIG. 1 comprises a controller-specific shaped configuration of an absorbent material 12 and means for affixing this material to such a controller. Preferably, the cover's 10 position is retained by a releasable fastener 14, such as hook-and-loop fasteners, thereby allowing removal of the cover 10 for washing (see FIG. 4). For permanent fixation, the cover 10 may be fixed in place by adhesive material 16 with peel-off protective backing 18. The cover 10 wraps around a back face 20 of a controller 22, as in FIG. 5, and in some embodiments, sides 24 or a top face 26, of the controller 10, as in FIG. 4. The cover may be monolithic with a grooved texture, as in FIG. 2, or comprised by multiple segments with a cross-hatched texture, such as in FIG. 3. This variation allows satisfaction of the user's preferences, and can increase the variety of game controllers with which the invention is compatible.

Figure 2:
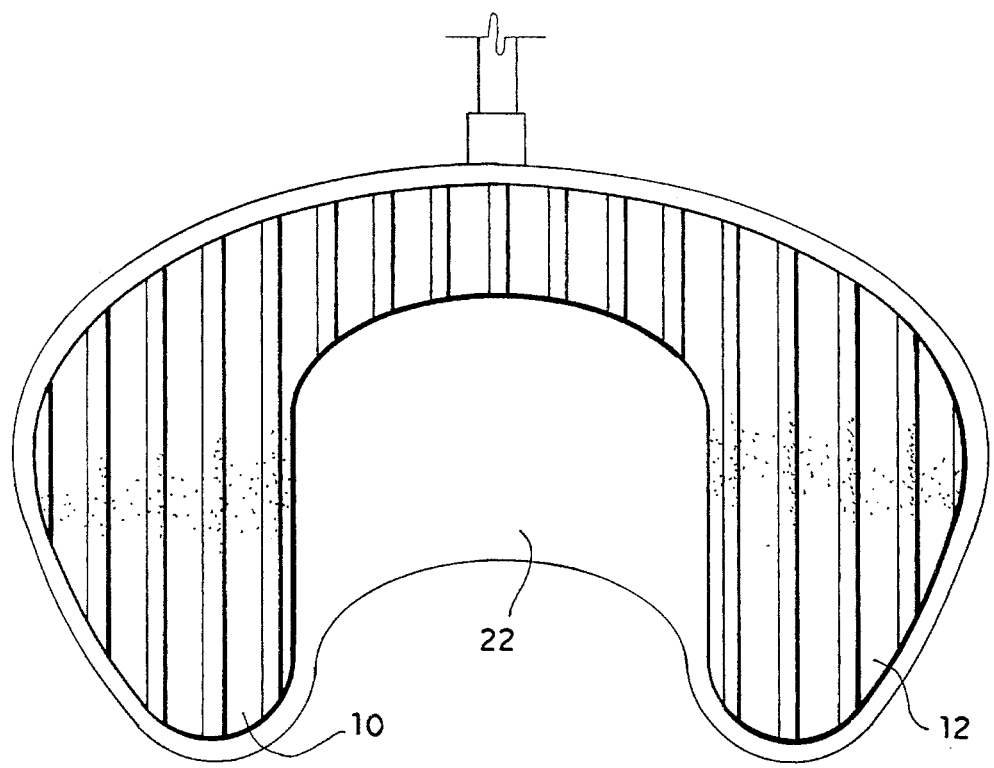
FIG. 2 is a bottom plan view of a one-piece embodiment of the invention, showing a grooved texture, attached to a game controller.
Figure 3:
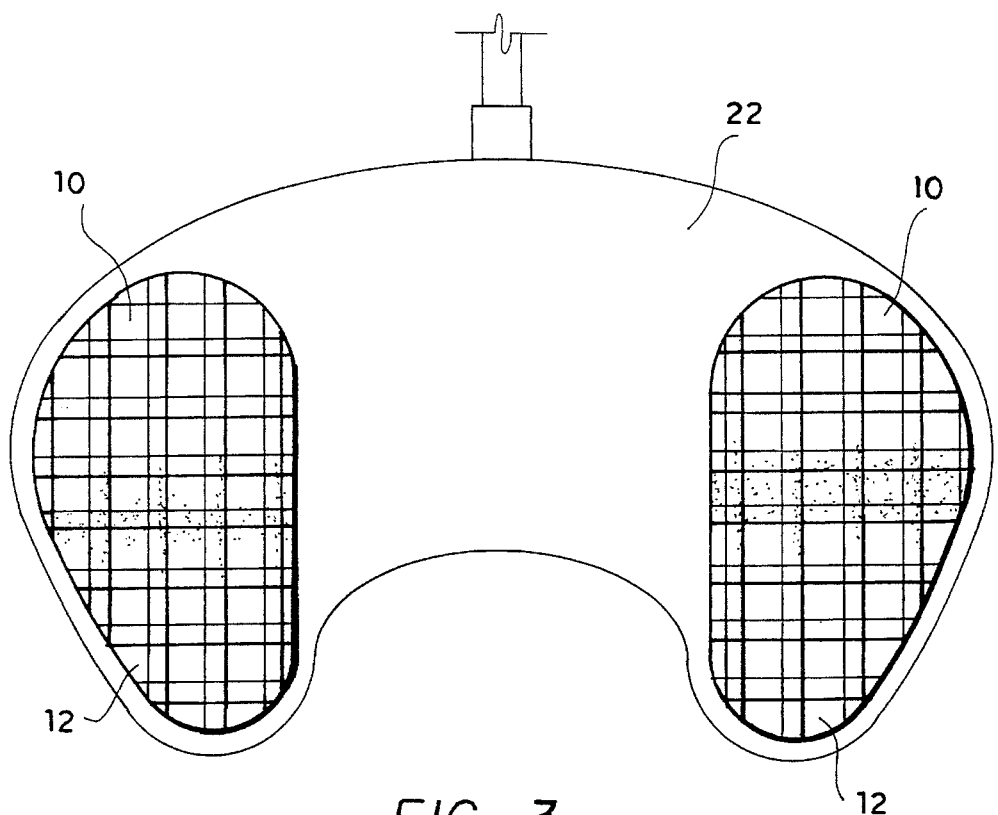
FIG. 3 is a bottom plan view of a two-piece embodiment of the invention, showing a cross-hatched texture, attached to a game controller.
Figure 4:
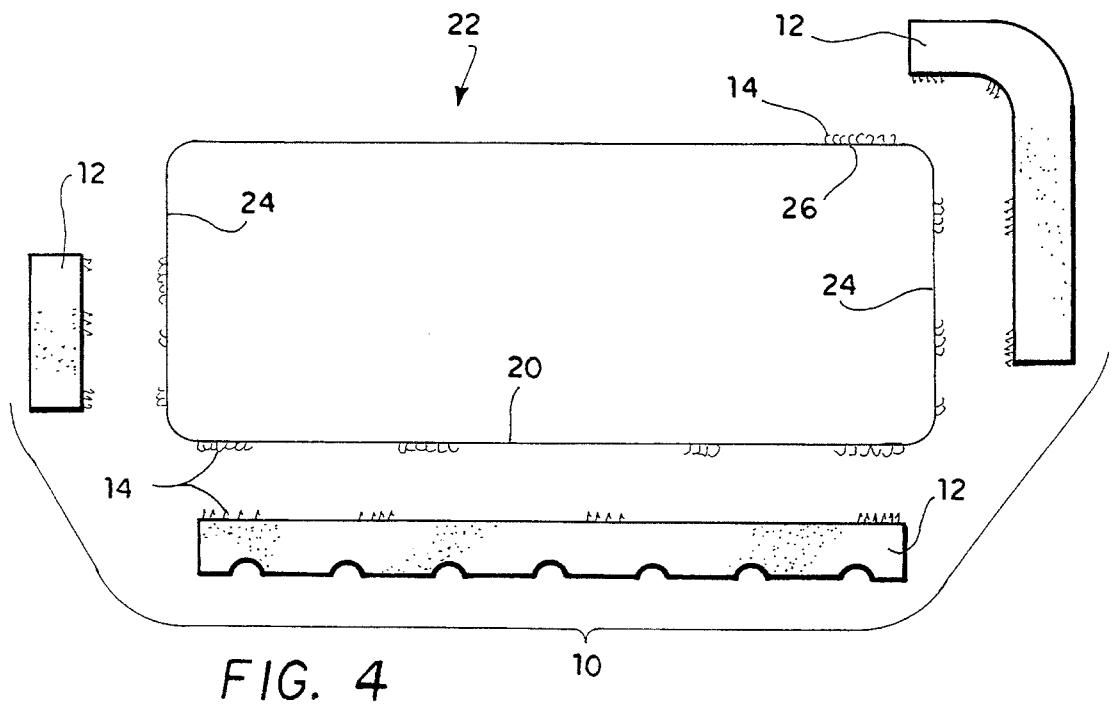
FIG. 4 is an exploded, partial cross-section of the invention showing hook-and-loop fastenings, optional tear-away side sections, dimpled texture, and a game controller.
Figure 5:
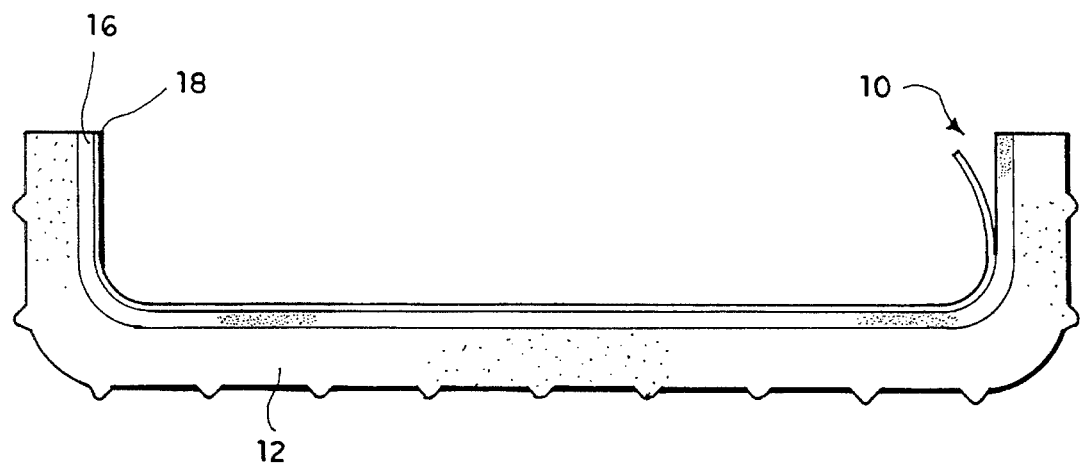
FIG. 5 is a partial cross-section of the invention showing an adhesive layer, optional monolithic side portions, protruding dimples, and peel-away adhesive backing.

The cover 10 may be colored to vary the appearance of the game controller 22. The cover 10 may also be comprised by a glow-in-the-dark substance so as to add to the novelty of the controller 22 and to make the controller 22 easy-to-locate, even in the dark. The cover may have any of a variety of textures, formed to fit the users' hands, or formed to provide additional friction with the users' hands. For example, a grooved texture is depicted in FIGS. 1 and 2, a cross-hatched texture is indicated in FIG. 3, a dimpled texture is shown in FIG. 4, and a bumpy texture is represented in FIG. 5. It is to be understood that other textures are possible, and the specific textures should not be construed to be limited to those listed. The present invention provides manufacturers and users with a convenient, attractive device to help assure the comfortable, effective use of an electronic game controller.

It is to be understood that the present invention is not limited to the sole embodiment described above, but encompasses any and all embodiments within the scope of the following claims.

I claim:

1. A combination of an electronic game controller case and a cover comprising:

an electronic game controller case containing means for controlling an electronic game;

a shaped, absorbent and textured covering material, whereby a game controller case can be partially covered; and, affixing means for attaching said shaped, absorbent and textured covering material to a game controller case;

whereby an electronic game controller case is partially covered to prevent the deleterious deposit of a user's perspiration and to improve the user's enjoyment of an electronic game being controlled.

2. The combination according to claim 1, wherein said affixing means are comprised by hook-and-loop fasteners.

3. The combination according to claim 1, wherein said affixing means are comprised by:

an adhesive layer on a back face of said absorbent material; and, a peel-off protective material disposed on said adhesive layer.

4. The combination according to claim 1, wherein said absorbent material glows in the dark.

5. The combination according to claim 1, wherein said absorbent material has a brightly colored surface.

6. The combination according to claim 1, wherein said absorbent material covers only a back face of said game controller.

7. The combination according to claim 1, wherein said absorbent material covers a back face and a plurality of side faces of said game controller.

8. The combination according to claim 1, wherein said absorbent material having recessed or protruding dimples, covers a back face, a plurality of side faces, and part of a top face of said game controller.

9. The combination according to claim 1, wherein said absorbent material comprises a plurality of physically disconnected portions which are textured with cross-hatching.

10. The combination according to claim 1, wherein said absorbent material is one piece and textured with grooves.

* * * * *